Jan. 29, 1935.  J. F. KÖSTER  1,989,454
APPARATUS FOR STORING AND OBSERVING PICTURES,
ESPECIALLY SMALL PHOTOGRAPHIC PICTURES
Filed Aug. 19, 1931
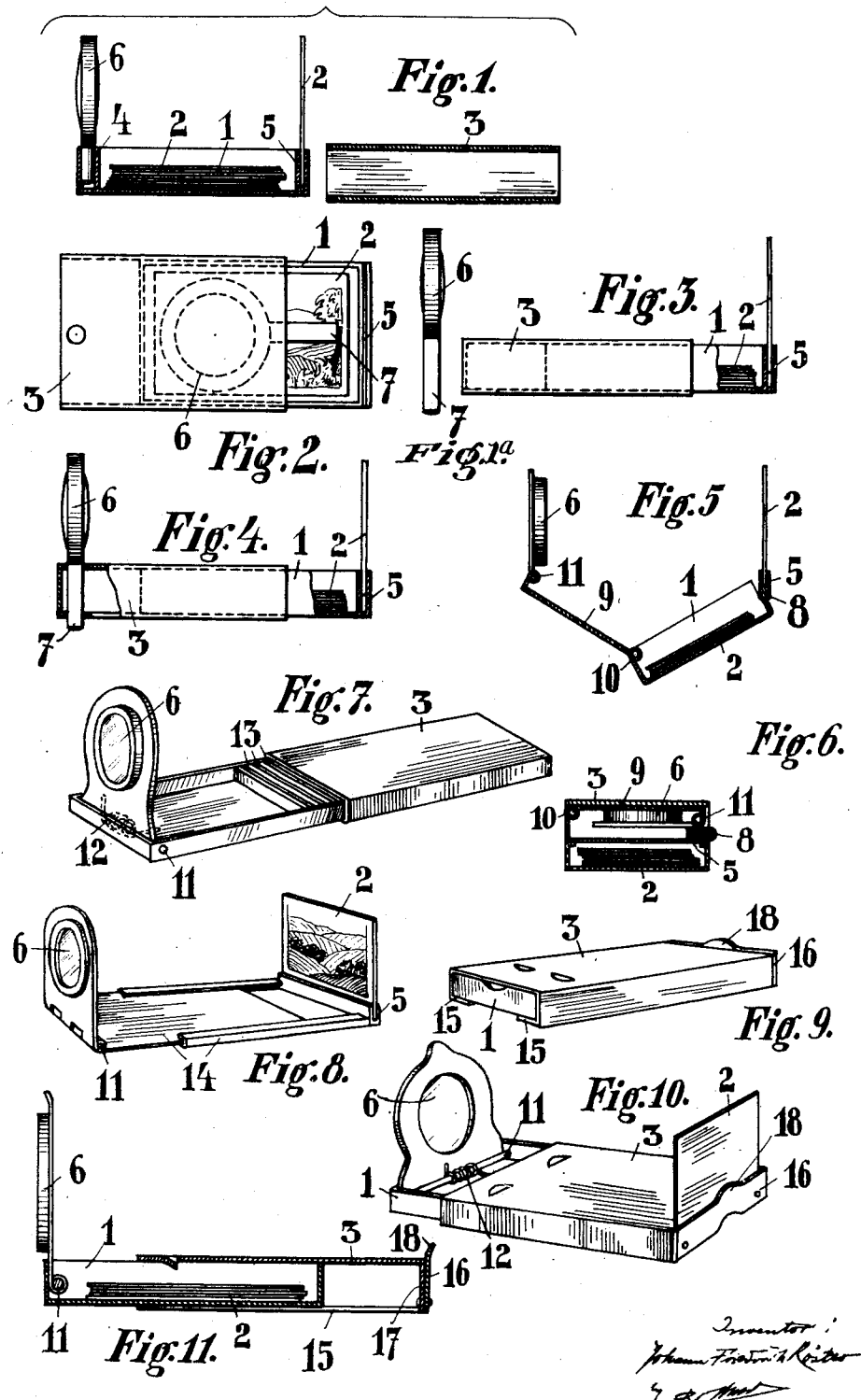

Patented Jan. 29, 1935

1,989,454

UNITED STATES PATENT OFFICE 1,989,454

APPARATUS FOR STORING AND OBSERVING PICTURES, ESPECIALLY SMALL PHOTOGRAPHIC PICTURES

Johann Friedrich Köster, Frankfort-on-the-Main, Germany

Application August 19, 1931, Serial No. 558,086

2 Claims. (Cl. 88—39)

The subject matter of the invention renders it unnecessary, to keep pictures which are subject to a relatively cursory observation in albums, or to keep a collection of souvenirs or advertising pictures slipped or pasted in books or on sheets.

A closable container serves according to the invention for storing the pictures and is provided with arrangements on some portion thereof, which enable on the one hand an insertion and placing of one of these pictures and on the other hand a holding and carrying of a magnifying glass, likewise stored in the container, in the optical axis of the picture.

Thus it becomes possible to utilize very small pictures, which appear in the desired size through the magnifying glass so that a large pile of most important pictures, for example of a town, a museum, an exhibition, an event, a business or personal matter and the like, can be accommodated in a container, for example of waistcoat pocket size, without the observation of the pictures with all details being dependent upon the presence of special apparatus. It is evident that it is desirable for the inserting device for the picture and also the magnifying glass to be so constructed relative to the optical axis and also to the other optical conditions that persons with abnormal sight can easily use the apparatus. For this purpose the insertion device for the picture and the holding device for the magnifying glass may be made mutually slidable or mutually shiftable so that the distance between the magnifying glass and the picture is adjustable as desired.

Further it is also possible to separate the container from the observing device, if the observing device, owing to it being collapsible, can be made of such size and thickness that it can be inserted in the container for the small pictures.

The subject matter of the application is evidently of particular importance for small photographic pictures, such as are to-day often produced for the purpose of saving photographic material and reducing the size of the camera. Even such pictures, of which it is desired to recognize the details, need no longer be enlarged, which would render them expensive and make them of a size inconvenient for storing.

Several embodiments of the invention are illustrated by way of example in the accompanying drawing in which:

Fig. 1 shows in section, a container of waistcoat pocket size and a sliding box removed therefrom, one end of the box being constructed for clamping the picture and the other end for fixing the magnifying glass, provided with a handle and adapted to be loosely placed in the container.

Fig. 1a is an edge elevational view of the magnifying glass.

Fig. 2 is a top plan view of an arrangement, in which the sliding box carries the arrangement for clamping the picture, and the container case carries the arrangement for holding the magnifying glass, the distance between the magnifying glass and the picture being adjustable.

Fig. 3 is a side elevation, partly in section, of Fig. 2 with the magnifying glass separate from the apparatus.

Fig. 4 is a similar view to Fig. 3 with the magnifying glass in position in the apparatus.

Fig. 5 shows in longitudinal section a container having a cover provided with the magnifying glass and the box provided with a carrier for the picture, hinges being provided for adjusting the distance between the magnifying glass and the picture.

Fig. 6 shows the arrangement illustrated in Fig. 5 in closed position.

Fig. 7 shows the pull out box without outer slidable cover, with spring controlled magnifying glass and a plurality of divisions for inserting the lower edge of the picture for varying the distance between the magnifying glass and the picture.

Fig. 8 shows an apparatus in which the carrier for the magnifying glass is foldable to the cross sectional area of the sliding box and the picture holder of a size and thickness to enable it to be placed in a small box.

Fig. 9 shows in perspective view in closed condition a container for small pictures, in which the magnifying glass springs into the position for use when the box is being opened.

Fig. 10 is a similar view, showing the container in position for use.

Fig. 11 is a longitudinal section of Figs. 9 and 10.

In the drawing 1 represents the box proper, in which the small pictures 2 are stored in lying position.

This box is slipped into a casing 3 open at both ends. The pictures 2 are presumed to be small pictures, for example taken with a small camera, but may also be prints or colored pictures, which are made in small size for facilitating storing, or of which it is necessary to magnify in order to observe the details. Consequently, the container 1, 3 may be made in waistcoat pocket size, if the pictures 2 are very small so that they can scarcely be observed with the naked eye. The container 1, 3 may also be made of larger size, for even if the pictures 2 are large, they may contain details, which it is desired to regard through a magnifying glass.

The novelty consists in the fact, that the container on the one hand is in parts utilized for the observing device and on the other hand at the same time encloses or contains the means necessary for the observing device.

In Fig. 1 the sliding box 1 is provided at its rear end with an insertion device 5, in which the lower end of one of the pictures 2 is clamped. A socket 4 is provided for the magnifying glass 6 on the front end of the sliding box 1. The magnifying glass is placed in the box 1 and must be taken therefrom like the picture for observing this picture 2.

In the form of construction illustrated in Figs. 2, 3 and 4, the clamping device 5 for the picture 2 is arranged on the slide box 1, similar to the construction, shown in Fig. 1. The handle 7 of the magnifying glass 6 is however inserted through two apertures in the slide casing 3, this presenting the advantage, that the distance between the magnifying glass 6 and the picture 2 can be increased or reduced by sliding the container parts 1 and 3 the one within the other.

Fig. 2 shows how the pictures and the observing device are packed.

In Fig. 5 the pictures 2 lie in the box 1. The insertion device 5 for the picture 2 is mounted on a hinge 8. The lid 9 is mounted as a folding lid on a hinge 10 on the box 1. The magnifying glass 6 is connected to the lid 9 by a further hinge 11. All the parts, including the pictures, can be folded together, as illustrated in Fig. 6. According to Fig. 5 the distance between the magnifying glass 6 and the picture 2 can be easily adjusted, without a sliding device being provided between the magnifying glass 6 and the picture 2.

In the construction illustrated in Fig. 6, the container space proper for the pictures is situated lower than the space into which the picture observing device is clamped.

In the arrangement according to Fig. 7, both the sliding device and also the hinge arrangement according to Figs. 5 and 6, are omitted. The magnifying glass 6 springs up around a hinge 11 under the action of a spring 12, as soon as the container for the pictures is slipped out of the sliding case 3. Instead of a single slot 5 as in Figs. 1, 3 and 4, several slots 13 are arranged to enable the distance between the magnifying glass 6 and the picture 2 to be regulated.

Whereas in the arrangements above described, the container proper is connected in some way to the parts of the arrangement serving for observing the pictures, this may be effected indirectly with the aid of the arrangement illustrated in Fig. 8. This arrangement consists of a carrier 14, on which the insertion device 5 for the picture and the magnifying glass 6 are mounted. The magnifying glass 6 is oscillatable around a hinge 11, and the entire carrier 14 is made in the size of the cross section of the container, or can be brought to this size with the aid of guides, hinges and sliding devices. Consequently, although the observing device is separate from the container proper, it is nevertheless so constructed that it can also be accommodated in a miniature picture container, that is in a container containing pictures of a reduced size.

In the construction illustrated in Figs. 9 to 11, 1 also designates a drawer-like container for accommodating the small pictures 2. The container 1 has on its front end a hinge 11 and a spring 12 connecting the magnifying glass 6 to the box 1. The spring 12 forces the magnifying glass 6 into the position for use illustrated in Fig. 10, as soon as the box illustrated in Fig. 9 is opened by being pulled out of the casing 3. In this instance the casing 3 is not open at both ends, but merely forms a cover, which engages with its two bent over parts 15 under the bottom of the box 1. When opening, the sliding casing 3 is merely pulled back. 16 is a resilient band fixed on a bent portion 17 of the casing 3 and having a projection 18 for facilitating the supporting of the picture 2. This picture 2 is slipped with its lower edge between the parts 17 and 18.

I claim:—

1. An apparatus for storing and observing miniature pictures comprising in combination, a container, a slide box closure therefor completely housing the container when the latter is out of use and capable of complete removal from the container, the slide box closure having means at one end thereof independent of the container for the support of a magnifying glass, a magnifying glass carried by the container when not in use and adapted to be mounted in the supporting means at one end of the slide box closure when in use for viewing the pictures and a device to facilitate the positioning of a picture at the end of the container spaced from the magnifying glass support.

2. An apparatus for storing and observing miniature pictures comprising in combination, a container, a slide box closure therefor completely housing the container when the latter is out of use and capable of complete sliding removal from the container, a magnifying glass carried by the container when not in use, a device to facilitate the positioning of a picture at the other end of the container, and said slide box closure having openings in the top and bottom walls thereof adjacent one end for the support of the magnifying glass when the slide box closure is partially removed from the container.

JOHANN FRIEDRICH KÖSTER.